United States Patent

Fang et al.

[11] Patent Number: 5,812,700
[45] Date of Patent: Sep. 22, 1998

[54] DATA COMPRESSION NEURAL NETWORK WITH WINNER-TAKE-ALL FUNCTION

[75] Inventors: Wai-Chi Fang, San Marino; Bing J. Sheu, Los Angeles, both of Calif.

[73] Assignee: California Institute of Technology, Pasadena, Calif.

[21] Appl. No.: 856,344

[22] Filed: May 14, 1997

Related U.S. Application Data

[63] Continuation of Ser. No. 313,859, Sep. 26, 1994, abandoned.

[51] Int. Cl.$^6$ .................. G06K 9/36; G06K 9/46
[52] U.S. Cl. ............. 382/239; 382/232; 382/244; 382/156
[58] Field of Search ................. 382/156, 232, 382/239, 246, 250, 253, 244; 358/427, 430, 432, 433; 348/403–404, 418, 420, 422

[56] References Cited

U.S. PATENT DOCUMENTS

| | | | |
|---|---|---|---|
| 4,602,333 | 7/1986 | Komori | 382/236 |
| 5,005,206 | 4/1991 | Naillon et al. | 382/253 |
| 5,267,334 | 11/1993 | Normille et al. | 382/236 |
| 5,333,212 | 7/1994 | Ligtenberg | 382/250 |
| 5,339,164 | 8/1994 | Lim | 358/430 |
| 5,420,639 | 5/1995 | Perkins | 348/418 |
| 5,450,132 | 9/1995 | Harris et al. | 348/418 |

OTHER PUBLICATIONS

"A Neural Network Based VLSI Vector Quantizer for Real-Time Image Compression" Fang et al. IEEE Comp. Soc. Press 1991 pp. 342–351.
"Data Compression and VLSI Implementation" Fang, Wai-Chi ASIC Conference Sep. 1993 pp. 570–579.
Rice, Robert F. *On the Optimality of Code Options for a Universal Noiseless Coder*, JPL Publication 91–92, Feb. 15, 1991.
Rice, Robert F. *Some Practical Universe Noisless Coding Techniques, Part III, Module PS114, K+*, JPL Publication 91–93, Nov. 15, 1991.

Primary Examiner—Leo H. Boudreau
Assistant Examiner—Bhavesh Mehta
Attorney, Agent, or Firm—Michaelson & Wallace

[57] ABSTRACT

The invention is embodied in an image data system including a lossy image compressor having an image compression ratio in excess of 10 for producing first compressed image data from an original image, the first compressed image data specifying a corresponding one of a set of predetermined images, apparatus for computing an difference between the original image and the predetermined image specified by the first compressed image data and a lossless image compressor for compressing at least the difference to produce second compressed image data.

22 Claims, 7 Drawing Sheets

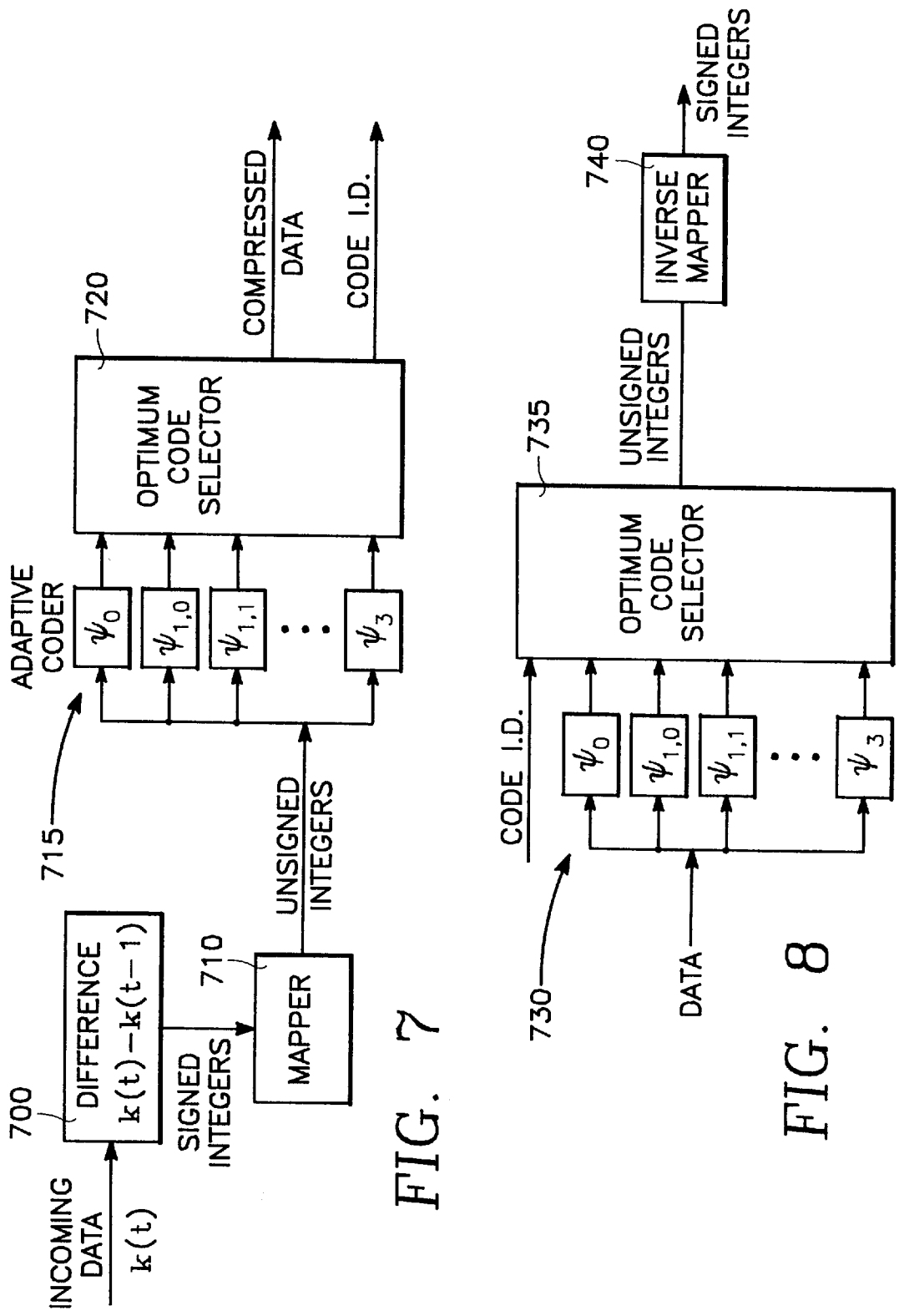

DATA COMPRESSION NEURAL NETWORK WITH WINNER-TAKE-ALL FUNCTION

This is a continuation of application Ser. No. 08/313,859, filed Sep. 26, 1994, now abandoned.

BACKGROUND OF THE INVENTION

1. Origin of the Invention

The invention described herein was made in the performance of work under a NASA contract, and is subject to the provisions of Public Law 96-517 (35 USC 202) in which the Contractor has elected to retain title.

2. Technical Field

The invention is related to image compression devices and in particular to an image compression device employing a neural network.

BACKGROUND ART

The amount of digital data required to represent a high-quality video image is so great that it must be compressed in order to be transmitted over a data channel within a reasonable amount of time. A typical image compression device performs a discrete cosine transform on successive blocks of an image and then encodes the transformed data in accordance with a minimum redundancy code such as a Huffman code. A lossless compression device currently used to obtain high-quality images from spacecraft employs an adaptive code algorithm first described in R. F. Rice, "Some Practical Universal Noiseless Coding Techniques", *JPL Publication* 91-3, Jet Propulsion Laboratory, Pasadena, Calif., Nov. 15, 1991 and R. F. Rice et al., "On the Optimality of Code Options for a Universal Noiseless Coder", *JPL Publication* 91-2, Jet Propulsion Laboratory, Pasadena, Calif., 1991.

In many image compression applications, lossless compression is not necessary. In such applications, all possible images can be classified into a limited number (e.g., sixty-four) of basic distinguishable groups of similar images, each group represented by a single basic image. In this case, performing lossless compression on the image data wastes resources in both processing time and transmission time.

Another problem is that the imaging system may be re-directed to a different scene, for example, so that new image data is acquired which is no longer classifiable into the original set of groups of similar images. Thus, there is a need for a compression device which is adaptive to changes in the nature of the incoming image data.

SUMMARY OF THE INVENTION

The invention is embodied in an image data system including a lossy image compressor having an image compression ratio in excess of 10 for producing first compressed image data from an original image, the first compressed image data specifying a corresponding one of a set of predetermined images, apparatus for computing a difference between the original image and the predetermined image specified by the first compressed image data and a lossless image compressor for compressing at least the difference to produce second compressed image data. The lossy compressor includes a first memory for storing the set of predetermined images, a neural network having an input layer and an output layer, the neural network having a plurality of possible states and being trained to produce a respective one of the states at the output layer for a respective one of the predetermined images received at the input layer and a winner-take-all circuit connected to outputs of the output layer for selecting a winning one of the states of the neural network from all possible states of the neural network, wherein the first compressed image data corresponds to the winning state. Preferably, each of the predetermined images is stored in the first memory in accordance with a respective image index, and the compressor includes a codebook correlating a respective image index with a corresponding winning state of the neural network, and wherein the first image data includes data identifying the winning state. In accordance with one embodiment, the first memory is updated by replacing the predetermined image corresponding to the winning state with the original image, whereby the lossy compressor is adaptive to images from new scenes. The differences may be employed in a corresponding de-compressor at a receiving end of a channel to similarly update its memory of the predetermined images to provide adaptability at both ends of the channel.

BRIEF DESCRIPTION OF THE DRAWINGS

FIG. 7 is a simplified schematic block diagram of a lossless image compressor employed in the image compression device of FIG. 4.

FIG. 8 is a simplified schematic block diagram of a lossless image de-compressor employed in the image de-compression device of FIG. 4.

DETAILED DESCRIPTION OF THE PREFERRED EMBODIMENTS

The present invention is an image compression system combining a lossy image compressor having a high compression ratio with a lossless image compressor, in which the output of the lossy image compressor is compressed by the lossless compressor. In order to compensate for the lossyness of the high ratio lossy image compressor, the error or difference between (a) the compressed image represented by the output of the lossy image compressor and (b) the original image is computed. This difference is itself compressed by another lossless compressor. The original image is thus represented by a compressed image (generated by the lossy compressor) and the compressed difference. The high-compression-ratio lossy compressor and the lossless compressor are now described.

HIGH COMPRESSION RATIO LOSSY IMAGE COMPRESSOR

Figure 1:
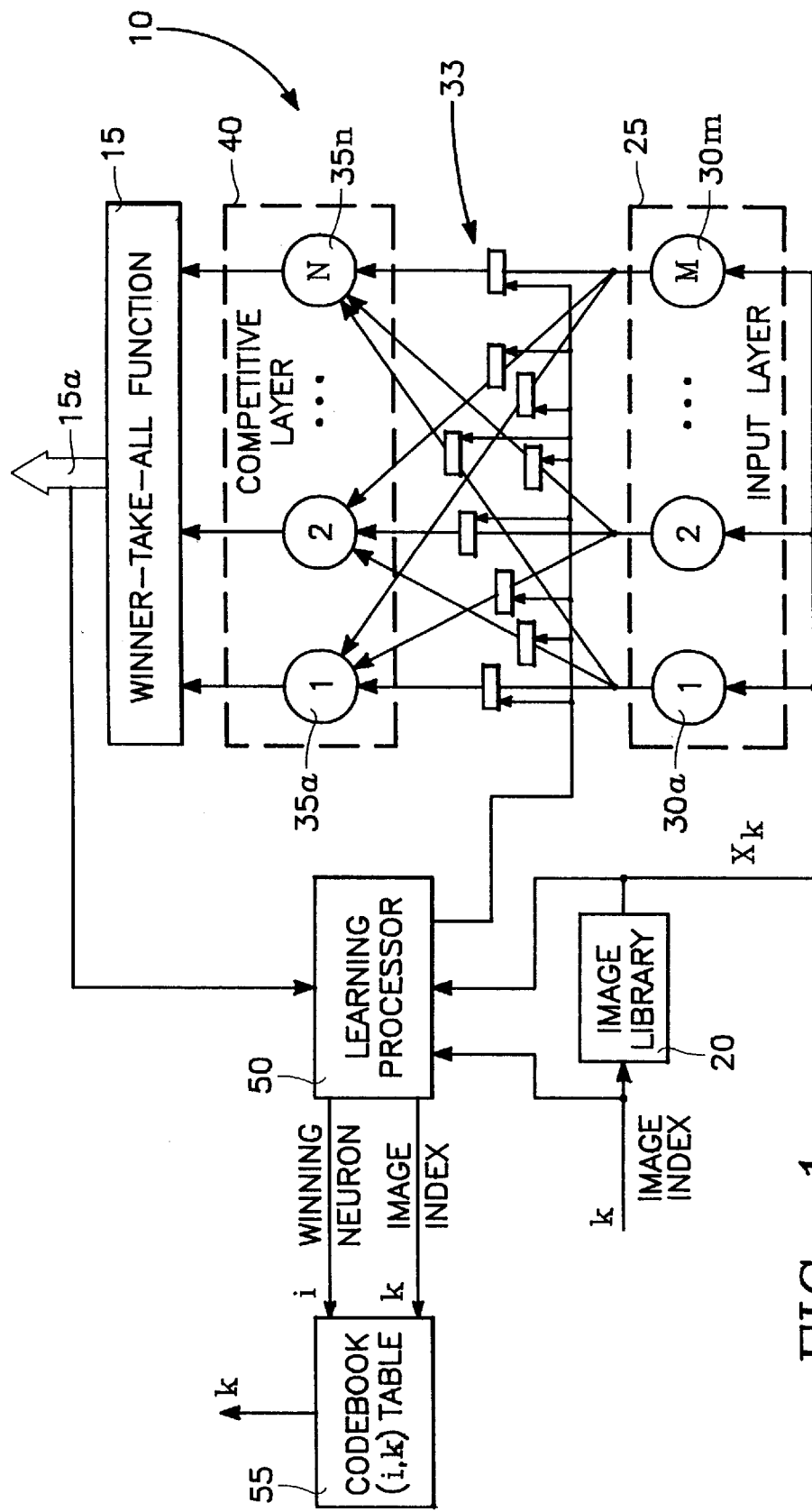
FIG. 1 is a schematic block diagram of a high-ratio lossy image compressor including a neural network having a winner-take-all function for training.

FIG. 1 illustrates a high compression ratio lossy image compressor including a neural network 10 with a winnertake-all circuit 15. A set of predetermined M-dimensional images or image vectors X(k) numbered in accordance with an image index k are stored in an image library 20 (preferably implemented as a random access memory). An input layer 25 of the neural network 10 consisting of M pass-through input nodes 30a–30m receives either a selected M-dimensional image from the image library 20 or an unknown M-dimensional image to be compressed. An M-by-N array of synaptic weights 33 connects each one of the M input nodes 30 with each one of N neurons 35a–35n in a competitive layer 40. The array 33 is an M-by-N dimensional matrix W of weight elements $W_{i,j}$. The competitive layer 40 includes the winner-take-all circuit 15. The winner-take-all circuit 15 has N inputs connected to the respective outputs of the N neurons 35 and an output 15a which identifies the index i of a single winning neuron 35 chosen in a manner to be described below. A learning processor 50 controls the training of the neural network 10 by updating the weights of the array of synaptic weights 33 in accordance with the index i output by the winner-take-all circuit 15, the image X(k) and the matrix W of weight elements $W_{i,j}$ in a manner to be described below. During training, as the learning processor selects a winning neuron i for a particular image X(k) in the library 20, the corresponding pair of indices i,k is stored in a table codebook 55. The codebook 55 is preferably implemented as a random access memory.

Figure 2:
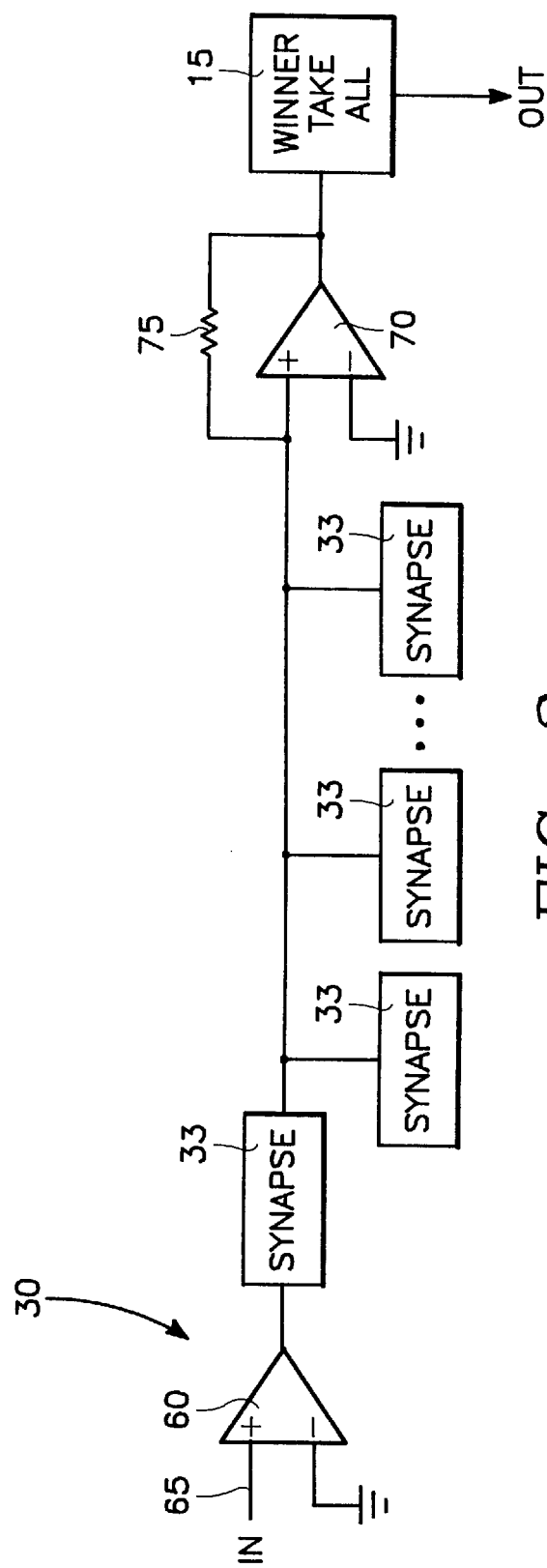
FIG. 2 is a schematic block diagram of a typical neuron of the neural network of FIG. 1.

Referring to FIG. 2, each input node 30 in the input layer 25 consists of an input amplifier 60 and amplifier input 65. The output of the amplifier 60 is connected through a respective one of the synaptic weights 33 to the input of a neuron 35. Each neuron 35 consists of an amplifier 70, its input being a negative input terminal, as illustrated in FIG. 2 with a feedback resistor 75 connected between the negative input and amplifier output of the amplifier 70.

To begin training, the neural network 10 is turned on (powered up) and, without necessarily changing the synaptic weights 33 from whatever random (but stable) pattern of weight values they may happen to assume initially, a given training image X(k) is applied to the input layer. The learning processor 50 governs the training of the neural network by identifying the neuron 35 having the greatest output signal for a given training image X(k) selected from the library 20 and modifying the synaptic weights 33 ($W_{i,j}$) to magnify the winning margin of the winning neuron's output. This process is repeated for each one of the training images with which it is desired to train the neural network 10. During use, each incoming image is identified by the neural network 10 outputting a winning neuron index i, which is then translated to an image index k using the codebook memory 55. The index k is what is transmitted, rather than the image itself. Compression is achieved because the number of bits of data required to represent any one of the M-dimensional images X(k) is far greater than the number of bits representing the image index k.

Figure 3:
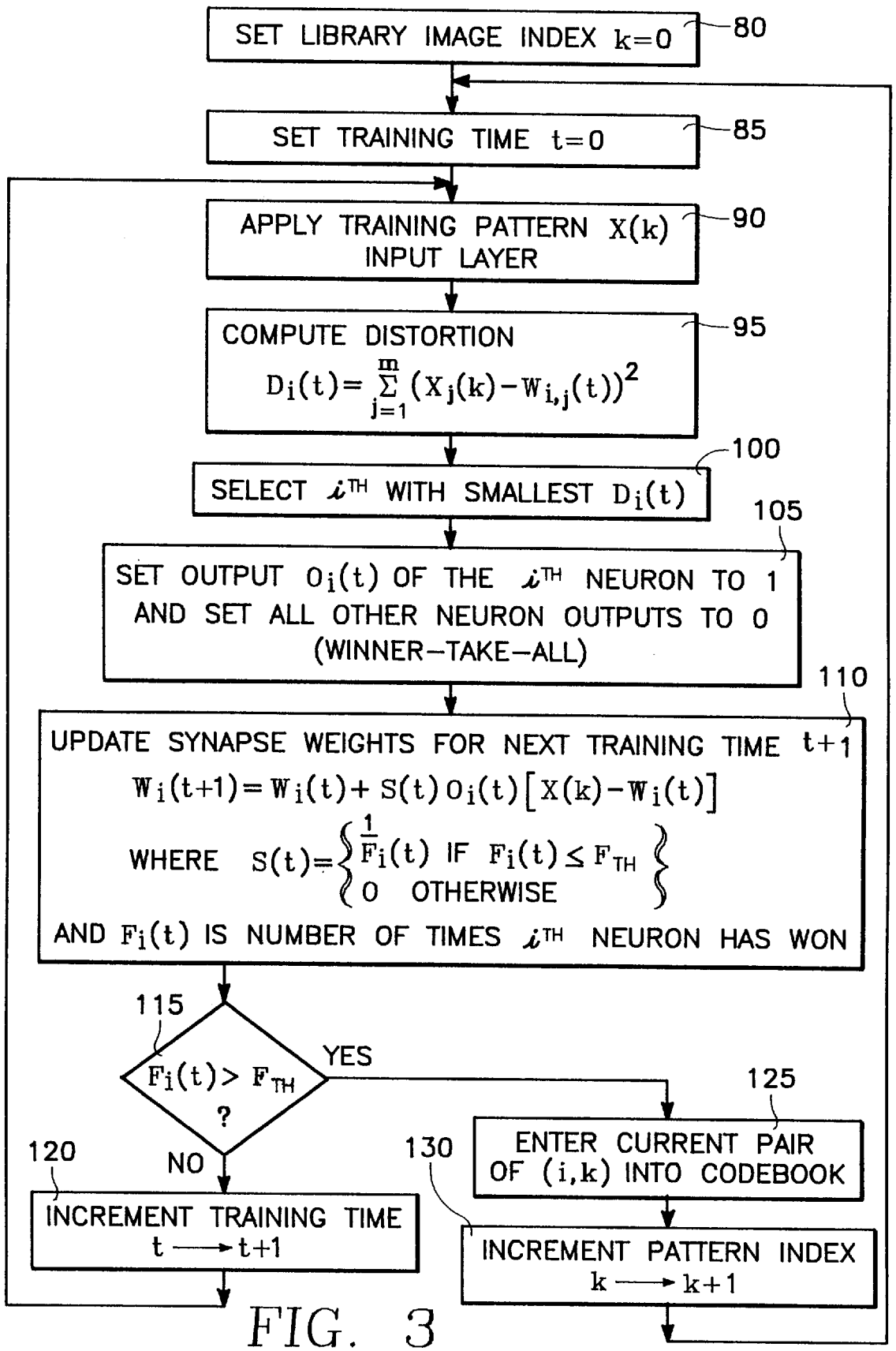
FIG. 3 is a flow diagram illustrating the winner-take-all training method for training the neural network of FIG. 1.

The training process performed by the learning processor 50 is illustrated in detail in FIG. 3. This process begins with the first image X(0) stored in the library 20 (by setting the library image index k=0 in block 80 of FIG. 3). Also, a training iteration time t is initialized to zero (block 85 of FIG. 3). The $k^{th}$ library image (where k=0 in this initial iteration) is applied to the input layer 25 (block 90 of FIG. 3). Then, for each one of the neurons 35, the learning processor 50 computes an error or difference between the M-dimensional image vector X(k) and the M-dimensional column of the M-by-N synapse matrix W connected to the one neuron. The neuron corresponding to the column of synapse matrix elements most closely resembling the image vector X(k) (i.e., having the smallest difference) is the winning neuron for this image. This difference is computed as follows:

$$D_i = \Sigma_j [X_j(k) - W_{i,j}(t)]^2$$

where i is the index of the $i^{th}$ neuron (block 95 of FIG. 3). The value of i associated with the smallest $D_i$ identifies the candidate neuron (block 100 of FIG. 3). The winner-take-all circuit 15 then sets the output of the winning neuron to 1 (or a maximum voltage representing a logic 1) and all other neuron outputs to zero (block 105 of FIG. 3).

Next, the learning processor 15 updates each one of the synaptic weight elements ($W_{i,j}$) 33 within the column of W associated with the winning neuron (i.e., all elements $W_{i,j}$ whose column index i equals the index i of the winning neuron) in accordance with the difference between that matrix element and the corresponding element of the image vector X(k). This operation is as follows:

$$W_{i,j}(t+1) = W_{i,j}(t) + S(t)[X(k)_j - W_{i,j}(t)]$$

where S(t) is the inverse of the number times $F_i(t)$ the $i^{th}$ neuron has won while the present library image X(k) has been applied to the input layer 25 (block 110 of FIG. 3). For this purpose, the learning processor 50 controls each synapse weight 33 individually using techniques well-known in the art. The training process for the library image X(k) is deemed to be completed as soon as $F_i(t)$ exceeds a predetermined threshold $F_{th}$ (YES branch of block 115 of FIG. 3). Otherwise (NO branch of block 115), the training time is incremented (block 120 of FIG. 3) and the process returns to block 90 to begin the next training cycle. If, however, $F_i(t)$ does exceed $F_{th}$, the index i of the winning neuron and the image index k of the currently applied library image X(k) are recorded as a pair in the codebook or table 55 (block 125 of FIG. 3), the library image index k is incremented (block 130) and the process reverts to the beginning step of block 85 to begin the training process for the next library image. The entire process is repeated until the neural network has been trained with all of the library images.

Figure 4:
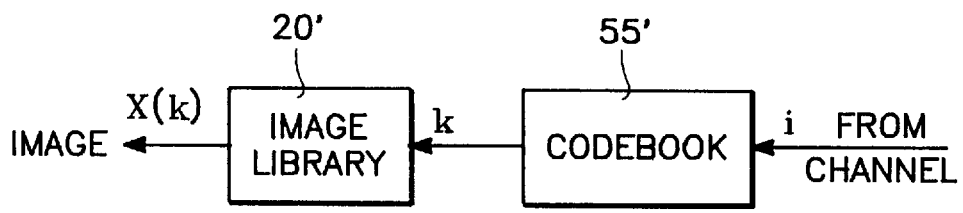
FIG. 4 is a schematic block diagram of a high-ratio lossy image de-compressor employed in the image de-compression device of FIG.

After training has been thus completed, during operation a succession of uncompressed image vectors in a data stream of such vectors are applied to the input layer 25, producing at the winner-take-all circuit output 15a a succession of neuron indices i, which are transmitted on a communication channel as compressed data representing the succession of uncompressed images. The compressed image data thus transmitted on the channel is de-compressed by a de-compressor which has the same codebook 55 and same image library 20 as the compressor of FIG. 1. Such a de-compressor is illustrated in FIG. 4. Each neuron index i received through the channel is translated by a codebook 55' to an image index k, which addresses an image library 20' to retrieve the corresponding library image X(k) as the uncompressed image. The lossyness of the compressor of FIG. 1 is the difference between the actual uncompressed image received at the input layer 25 and the corresponding library image X(k). Such a lossy image compressor typically has a compression ratio of about twenty.

In an alternative embodiment, the compressor of FIG. 1 transmits the image index k corresponding to the winning neural index i by employing the codebook 55 during operation, which eliminates the need for the codebook 55' in the de-compressor of FIG. 4.

Figure 5:
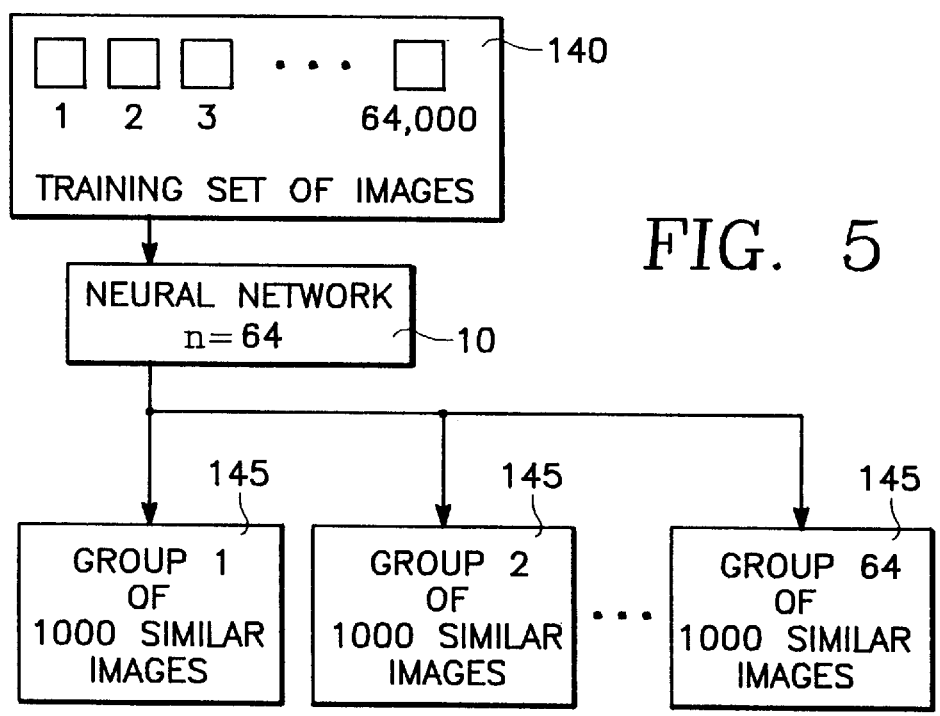
FIG. 5 is a block diagram illustrating the classifying function of the image compressor of FIG. 1.

One advantage of the invention illustrated in FIG. 5 is that the neural network 10 automatically classifies a large set 140 of different images (e.g., thousands of images) into N different groups 145 of similar images, thus simplifying certain image compression problems, where N is the number of neurons 35. For this purpose the threshold number of selections $F_{th}$ governing the training process is selected to be about twice the number of possible images divided by the number N of image groups. Thus, for example, to compress a large set of synthetic radar images (e.g., 12,000 images) with a relatively small number of neurons (e.g., N=64), the threshold $F_{th}$ is about 400. In this example, the neural network can be trained to recognize 64 different training images and will associate each one of the 12,000 possible images with the most similar one of the training images. In this example, the 12,000 possible different images will be grouped by the neural network into 64 groups of, on the average, 200 similar images.

Another advantage of the invention is that it automatically adapts to changing image sets. For example, the set of library images with which the neural network 10 has been initially trained for one scenario may not apply necessarily to another scenario. If scenarios are changed, the neural network can be trained in real time to a new set of images by simply reactivating the training process of FIG. 3 as the new images are received and then modifying the image library 20 and the codebook 55 accordingly.

Figure 6:
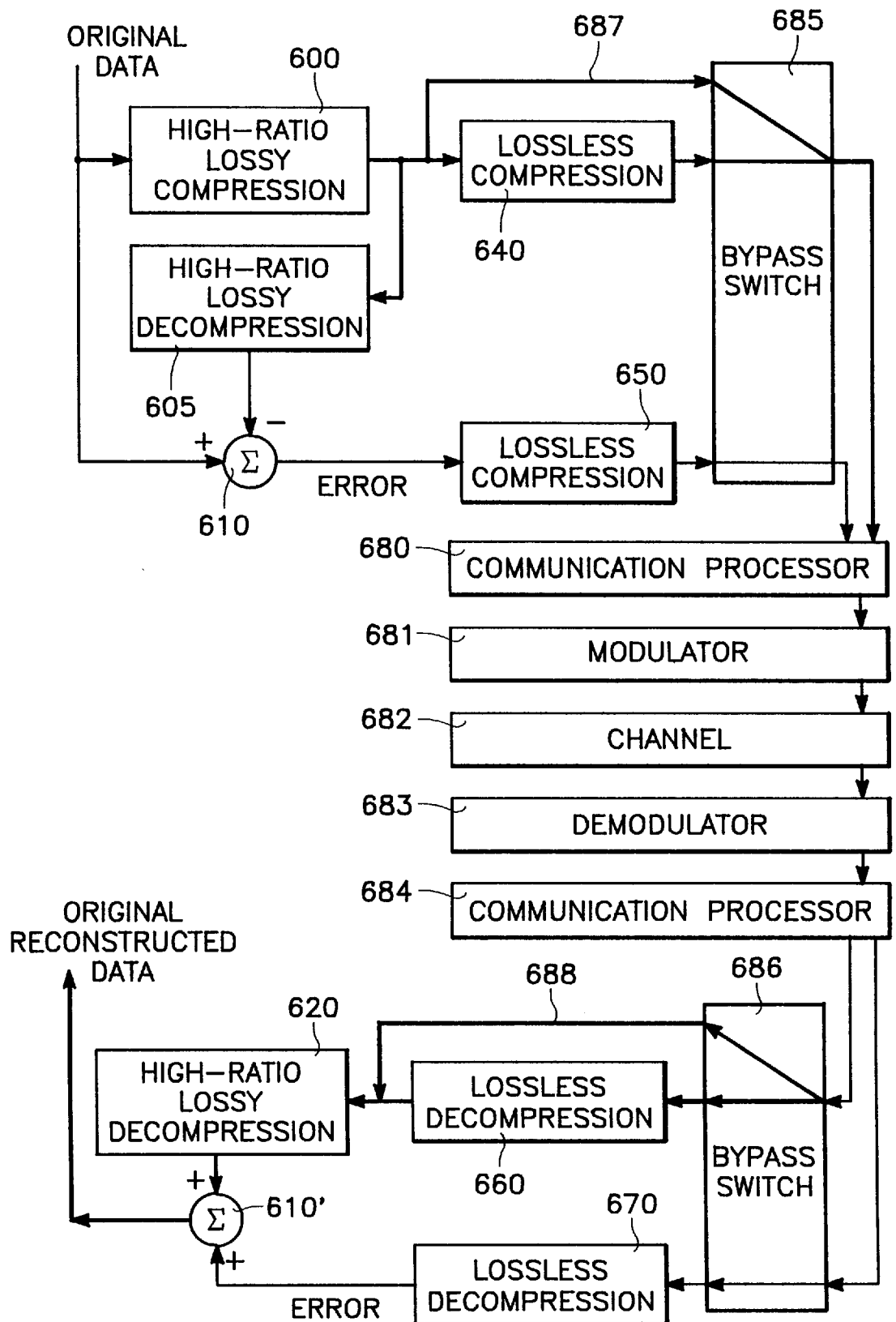
FIG. 6 is a schematic block diagram of an image communication system having an image compression device including the lossy image compressor of FIG. 1, a data communication channel and an image de-compression device.

In such a case, the revisions to the library 20 must be provided to the de-compressor of FIG. 4. The most efficient way of accomplishing this is for the compressor to transmit only the difference between the new library image and the original library image which it is to replace. This is illustrated in FIG. 6, in which a high-ratio lossy compressor 600 corresponding to the compressor of FIG. 1 has its output connected to a de-compressor 605 corresponding to the de-compressor of FIG. 4. The output of the de-compressor 605 is subtracted at a node 610 from the uncompressed image, and the difference is transmitted via the channel to the receiver/de-compressor 620. The receiver/de-compressor 620, corresponding to the de-compressor of FIG. 4, responds to the transmitted difference signal by adding it to the image in the library 20' corresponding to the current image index k.

In another aspect, the difference signal may be employed even in the absence of any change in scenario and revision of the image libraries 55, 55'. Instead, the difference signal provides a correction for the difference between a received uncompressed image and the most similar image stored in the image libraries 55, 55'. By transmitting the difference signal produced by the subtractor 610 of FIG. 6, the output of the de-compressor 620 is corrected with the difference signal to produce a more faithful uncompressed version of the original image. A summer 610' in the de-compressor adds the difference signal to the output of the lossy de-compressor 620 to produce the more faithful uncompressed version of the original image.

SYSTEM WITH LOSSY COMPRESSOR AND LOSSLESS COMPRESSOR

As illustrated in FIG. 6, the compressed image data (i.e., the neuron index i and the difference signal) are compressed in lossless compressors 640, 650, respectively, in the compression system of FIG. 6. Then, in the de-compression system of FIG. 6, lossless de-compressors 660, 670 de-compress the neuron index i and the difference signal, respectively. Such lossless de-compressors are preferably of the type employing the Rice algorithm referenced herein above. For this purpose, a conventional communication processor 680 multiplexes the outputs of the two lossless compressors 640, 650 into a single data stream for transmission via a conventional modulator 681 on a channel (or storage device) 682 for receipt (or retrieval) through a conventional demodulator 683. A conventional communication processor 684 demultiplexes the data stream into its two components, image data and difference data, and routs them to the lossless de-compressors 660 and 670, respectively. Bypass switches 685, 686 permit the image data from the lossy compressor 600 to bypass the lossless compressor 640 and the lossless de-compressor by routing the image signal along respective bypass paths 687, 688. A further option is for the communication processors 680, 684 to suppress the difference signal from the lossless compressor 650, if desired.

LOSSLESS IMAGE COMPRESSOR

One implementation of the lossless compressor 640 (and 650) is illustrated in FIG. 7, in which the incoming data is processed by a differencing element 700 which computes the differences between successive images (in the present case, the differences between successive neuron indices i). The resulting differences are signed integers which are mapped by a mapper 710 to unsigned integers. The data stream of unsigned integers is then encoded by a number of different entropy encoders 715, and an optimum code selector 720 chooses the output of only one of the encoders 715 for transmitting as compressed data along with a code I.D. identifying the chosen code. The choice of entropy code is dictated by the statistics of the particular block of data. Specifically, the optimum code selector first determines the code length corresponding to the particular data block and then chooses a particular entropy code optimum for that length, as described in the publication by Rice referenced herein above. One implementation of the lossless de-compressor 660 (and 670) is illustrated in FIG. 8, in which the incoming data is decoded by a corresponding set of entropy decoders 730. A code selector 735 selects the output of only one of the entropy decoders 730 in accordance with the transmitted code I.D. The decode data is mapped to signed integers by an inverse mapper 740, completing the de-compression process.

WINNER-TAKE-ALL CIRCUIT FOR THE LOSSY COMPRESSOR

Figure 9:
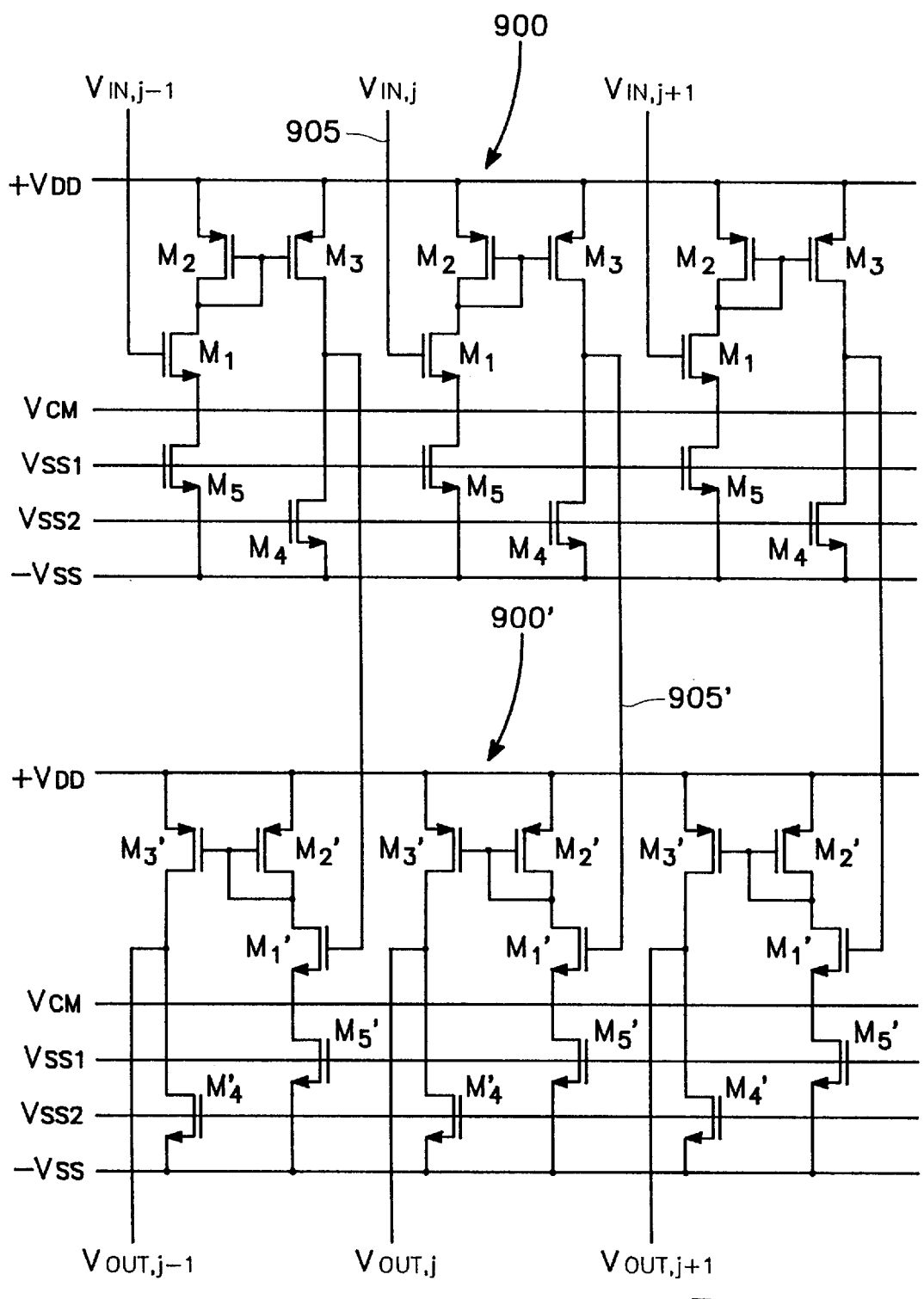
FIG. 9 is a schematic diagram of a winner-take-all circuit employed in the lossy compressor of FIG. 1.

A winner-take-all circuit which may be employed as the winner-take-all circuit 15 of FIG. 1 is disclosed by Wai Chi Fang, *VLSI Image Compression*, Ph.D. Dissertation, University of Southern California, Los Angeles, Calif. FIG. 9 illustrates a suitable design of the winner-take-all circuit 15 of FIG. 1. The winner-take-all circuit of FIG. 9 consists of plural identical cells 900a–900n, the number of cells 900 being equal to the number of neurons 35 in the competitive layer 40 of FIG. 1. Each cell 900i has an input line 905i connected to the output of the respective neuron 35i. Within each cell 900, an N-channel input metal oxide semiconductor field effect transistor (MOSFET) M1 has its gate. connected to the input line 905, its drain connected to the source and gate of a bias P-channel MOSFET M2 and its source connected to a common voltage line VCM shared among all cells 900. The drain of the bias MOSFET M2 is connected to a drain voltage line VDD. A P-channel current mirror MOSFET M3 has its gate connected to the gate of the bias MOSFET M2, its drain connected to the drain voltage line VDD and its source connected to an output line 910. An N-channel current bias MOS has its source connected to a source voltage line VSS, its drain connected to the common voltage line VCM and its gate connected to a first bias voltage line VBB1. A second N-channel current bias MOSFET has its source connected to the source voltage line VSS, its drain connected to the output node 910 and its gate connected to a second bias voltage line VBB2.

The array of cells 900 responds to a set of N simultaneous but at least slightly different input voltages $V_i$ from the N neuron outputs by pushing the output node 910 of the cell 900$i$ having the greatest input voltage toward the positive voltage of the drain voltage line VDD while pushing the output node of each remaining cell toward the source voltage line VSS. The array accomplishes this result as follows. As the input voltage $V_i$ to a particular cell 900$i$ increases, the voltage drop across the cell's input MOSFET M1 increases, driving up the gate voltage of the current mirror MOSFET M3. This in turn increases the voltage of the cell's output 910. Assuming the adjacent cell 900$j$ receives a smaller input voltage $Vj$, input MOSFET M1 of the adjacent cell 900$j$ has a smaller voltage drop and therefore more of the current from the common voltage line VCM flows through the input MOSFET M1 of the adjacent cell 900$j$ drive downward the gate voltage of the current mirror transistor M3 of that cell, cutting off M3. In contrast, in the particular cell 900$i$, less of the current from the common voltage line VCM flows through the input MOSFET M1, so that the current mirror MOSFET in that cell is not cut off. The common voltage line VCM provides a normalization among all cells, guaranteeing that the only cell having a positive voltage on its output node 910 is the one cell receiving the greatest input voltage $V_i$. In the preferred design, each cell 900 is cascaded with an identical output cell 900', so that there are two cascaded arrays of cells, an input array of cells 900$a$–900$n$ and an output array of cells 900$a$'–900$n$'. Each output cell 900' has the same elements as the input cell 900, including an input node 905', MOSFETs M1, M2, M3, M4, M4 and an output node 910'. The cascade arrangement provides enhanced performance. The restriction of the possible voltages of the output node 910 to either VDD or VSS provides a binary output.

The following table provides the preferred geometry of each of the MOSFETs, the first number being the length in micrometers of the MOSFET drain and the second number being the length in micrometers of the MOSFET gate.

TABLE I

| MOSFET | M1 | M2 | M3 | M4 | M5 |
| --- | --- | --- | --- | --- | --- |
| Sizes | 8 / 2 | 8 / 4 | 16 / 4 | 8 / 4 | 16 / 4 |

While the invention has been described in detail by specific reference to preferred embodiments thereof, it is understood that variations and modifications thereof may be made without departing from the true spirit and scope of the invention.

What is claimed is:

1. An image data system, comprising:
   a lossy image compressor having an image compression ratio in excess of 10 for receiving an original image and producing first compressed image data from said original image, said first compressed image data specifying an address index of a corresponding one of a set of predetermined images;
   means for computing a difference between said original image and said predetermined image specified by said first compressed image data;
   a selectively activated lossless image compressor for selectively compressing at least one of said difference and said first compressed image data to produce second compressed image data;
   wherein said lossy compressor further comprises a neural network being trained to produce states for a respective one of the predetermined images and a winner-take-all circuit for selecting a winning state of said neural network from all possible states of said neural network; and
   means for transmitting said first and second compressed image data.

2. The system of claim 1 further comprising:
   a lossless image de-compressor for receiving said second compressed image data and producing therefrom said difference;
   a lossy image de-compressor for receiving said first compressed image data and producing therefrom said one predetermined image specified by said first compressed image data; and
   means for adding said difference to said one predetermined image to produce a reproduction of said original image.

3. The system of claim 2 wherein said lossy compressor comprises:
   means for storing said set of predetermined images;
   wherein said neural network having an input layer and an output layer, said neural network having a plurality of possible states and being trained to produce a respective one of said states at said output layer for a respective one of said predetermined images received at said input layer;
   wherein said winner-take-all circuit connected to outputs of said output layer for selecting a winning one of said states of said neural network from all possible states of said neural network, wherein said first compressed image data corresponds to said winning state.

4. The system of claim 3 wherein each of said predetermined images is stored in said means for storing in accordance with a respective image index, said system further comprising:
   a codebook for correlating a respective image index with a corresponding winning state of said neural network, and wherein said first image data comprises data identifying said winning state.

5. The system of claim 4 wherein said lossy de-compressor comprises:
   a second memory for storing said set of predetermined images and for providing one of said predetermined images specified by said first compressed image data.

6. The system of claim 5 wherein said first compressed image data comprises data identifying said winning state, said second memory stores said predetermined images in accordance with corresponding image indices, said lossy de-compressor further comprising:
   a codebook correlating each one of said states of said neural network with a corresponding one of said image indices, whereby an image index corresponding to said winning state addresses said second memory to retrieve the corresponding predetermined image.

7. The system of claim 5 wherein said first memory is updated by replacing the predetermined image corresponding to said winning state with said original image, and said second memory is updated by adding said difference to the corresponding predetermined image in said second memory.

8. The system of claim 2 wherein said lossless compressor comprises:

plural entropy encoders each employing a different entropy code;

an optimum code selector for computing a code length of successive blocks of said second image data and choosing for each said block one of said plural entropy encoders whose code is optimum for the code length of that block; and means for generating data identifying the code chosen by said optimum code selector for transmission with said second compressed image data.

9. The system of claim 8 wherein said lossless de-compressor comprises:

plural entropy decoders; and means responsive to said data identifying the code chosen by said optimum code selector of said lossless compressor for choosing a corresponding one of said plural entropy decoders to decode said second image data.

10. The system of claim 1 wherein said lossy compressor comprises:

a first memory for storing said set of predetermined images;

wherein said neural network having an input layer and an output layer, said neural network having a plurality of possible states and being trained to produce a respective one of said states at said output layer for a respective one of said predetermined images received at said input layer;

wherein said winner-take-all circuit connected to outputs of said output layer for selecting a winning one of said states of said neural network from all possible states of said neural network, wherein said first compressed image data corresponds to said winning state.

11. The system of claim 10 wherein each of said predetermined images is stored in said first memory in accordance with a respective image index, said system further comprising:

a codebook for correlating a respective image index with a corresponding winning state of said neural network, and wherein said first image data comprises data identifying said winning state.

12. The system of claim 10 wherein said first memory is updated by replacing the predetermined image corresponding to said winning state with said original image, whereby said lossy compressor is adaptive to images from new scenes.

13. The system of claim 10 wherein said input and output layers are linked by an array of synapses, said system further including a learning processor comprising:

means responsive to identification of said winning state by said winner-take-all circuit for updating synapses associated with said winning state in accordance with the corresponding one of said predetermined images applied to said input layer during a training exercise;

means for storing the image index of the predetermined image applied to said input layer during a training exercise and an index identifying the corresponding winning state as a codebook entry.

14. The system of claim 1 further comprising a lossy compressor for compressing said first image data.

15. The system of claim 1, further comprising:

a bypass device for routing said first compressed image data to bypass said lossless image compressor so that said lossless image compressor does not compress said original image.

16. The system of claim 15, further comprising a switching device for selectively activating and deactivating said bypass device.

17. The system of claim 1, wherein said neural network is adaptable and is trained in real time.

18. An image data system, comprising:

a lossy image compressor having an image compression ratio in excess of 10 for receiving an original image and producing first compressed image data from said original image, said first compressed image data specifying an address index of a corresponding one of a set of predetermined images;

means for computing a difference between said original image and said predetermined image specified by said first compressed image data;

a lossless image compressor for selectively compressing at least one of said difference and said first compressed image data to produce second compressed image data;

bypass means for routing said first compressed image data to bypass said lossless image compressor so that said lossless image compressor does not compress said original image first compressed image data;

wherein said lossy compressor further comprises a neural network being trained to produce states for a respective one of the predetermined images and a winner-take-all circuit for selecting a winning state of said neural network from all possible states of said neural network; and means for transmitting said first and second compressed image data.

19. The system of claim 18, further comprising means for selectively activating and deactivating said bypass means.

20. The system of claim 19 wherein said lossy compressor comprises:

a first memory for storing said set of predetermined images;

a neural network having an input layer and an output layer, said neural network having a plurality of possible states and being trained to produce a respective one of said states at said output layer for a respective one of said predetermined images received at said input layer;

a winner-take-all circuit connected to outputs of said output layer for selecting a winning one of said states of said neural network from all possible states of said neural network, wherein said first compressed image data corresponds to said winning state.

21. The system of claim 20 wherein each of said predetermined images is stored in said first memory in accordance with a respective image index, said system further comprising:

a codebook for correlating a respective image index with a corresponding winning state of said neural network, and wherein said first image data comprises data identifying said winning state.

22. The system of claim 18, wherein said neural network is adaptable and is trained in real time.

* * * * *